United States Patent [19]

Dieterich

[11] 4,119,658
[45] Oct. 10, 1978

[54] AROMATIC ISOCYANATO-POLYSULPHONIC ACIDS

[75] Inventor: Dieter Dieterich, Leverkusen, Germany

[73] Assignee: Bayer Aktiengesellschaft, Leverkusen, Germany

[21] Appl. No.: 782,642

[22] Filed: Mar. 30, 1977

[30] Foreign Application Priority Data

Apr. 10, 1976 [DE] Fed. Rep. of Germany ....... 2615876

[51] Int. Cl.$^2$ ................. C07C 119/048; C07D 229/00
[52] U.S. Cl. ..................... 260/453 AR; 260/29.2 TN; 260/239 A; 260/453 AB; 260/453 AM; 260/508; 544/219; 560/12; 560/13; 528/44
[58] Field of Search ............ 260/453 AR, 239 A, 470, 260/453 AM, 453 AB; 560/12, 13

[56] References Cited

U.S. PATENT DOCUMENTS

| | | | |
|---|---|---|---|
| 3,826,769 | 7/1974 | Carlson | 260/29.2 TN |
| 3,959,329 | 5/1976 | Dieterich | 260/453 AR |
| 3,998,870 | 12/1976 | Carlson | 260/453 AR |

*Primary Examiner*—Dolph H. Torrence
*Attorney, Agent, or Firm*—Gene Harsh; Joseph C. Gil; William E. Parry

[57] ABSTRACT

The present invention relates to isocyanato-polysulphonic acids comprising from 1 to 3 aromatically bound isocyanate groups which may be present at least partly in the dimerized form as uretdione groups and from 2 to 6 sulphonic acid groups for each non-dimerized isocyanato-polysulphonic acid or for each monomeric isocyanato-polysulphonic acid on which the dimer is based. These acids are produced by reacting mono- or poly-isocyanates having exclusively aromatically bound isocyanate groups with sulphur trioxide at $-10°$ C to $140°$ C, wherein the isocyanate used as starting material which is to be sulphonated is reacted with at least 50% by weight of sulphur trioxide, based on the quantity of isocyanate used as starting material. Alternatively they may be produced using isocyanate-monosulphonic acids which have exclusively aromatically bound isocyanate-groups.

9 Claims, No Drawings

AROMATIC ISOCYANATO-POLYSULPHONIC ACIDS

BACKGROUND OF THE INVENTION

It is known to react aromatic diisocyanates with sulphur trioxide, oleum or sulphuric acid to produce monosulphonic acids of the isocyanates. U.S. Pat. No. 3,826,769, for example, describes a process for the sulphonation of tolylene diisocyanate in which the diisocyanate is mixed with less than a molar equivalent of sulphur trioxide. In this process, the sulphonation product precipitates from the liquid starting isocyanate in crystalline form.

The partial sulphonation of liquid mixtures of diisocyanates and polyisocyanates is described in German Offenlegungsschriften Nos. 2,227,111; 2,359,614 and 2,359,615 (U.S. application Ser. Nos. 363,436 and now abandoned; 527,473; and U.S. Pat. No. 3,959,329). In these cases precipitation of solid sulphonation product does not generally occur. Rather liquid polyisocyanates which contain sulphonic acid groups and which have valuable commercial properties are formed. The isocyanates which are to be sulphonated are mixed with from about 0.1 to about 32% by weight or, in extreme cases, with up to about 40% by weight of sulphur trioxide or an equivalent quantity of oleum, sulphuric acid or chlorosulphonic acid. This means that invariably less than 1 mol of sulphur trioxide is used for 1 mol of isocyanate. These sulphonation products will generally contain a maximum of 11.4% by weight of sulfur.

According to an earlier proposal (German patent application No. P 25 24 476.2), aromatic uretdione-diisocyante disulphonic acids are prepared by the reaction of aromatic dinuclear diisocyanates with sulphur trioxide. The molar ratio of dissocyanate to sulphur trioxide given for this reaction is between about 1:1 and 1:1.4, but even if a ratio above or below this range is employed the reaction products consist mainly of uretdione-diisocyanate disulphonic acids, in other words products containing one sulphonate group per monomer unit. The sulphur content of the products is about 8 to 10%.

Isocyanates having two or more sulphonic acid groups per monomer unit have not hitherto been known. Their formation has not been observed under the conditions hitherto employed for sulphonation.

DESCRIPTION OF THE INVENTION

It has now surprisingly been found that aromatic isocyanatopolysulphonic acids are formed either when monosulphonic acids obtained by the sulphonation of aromatic isocyanates are reacted with a further quantity of sulphur trioxide or when aromatic isocyanates are reacted with more than 50% by weight of sulphur trioxide, based on the quantity of isocyanate put into the process. Aromatic isocyanatopolysulphonic acids are especially obtained when 1 mol of aromatic isocyanate is reacted with from 2 to 6 mol of sulphur trioxide. In this reaction, the aromatic isocyanatopolysulphonic acids are in most cases obtained in the dimerized form, i.e. they contain uretdione groups. Thus, for example, diiosycanatotoluene gives rise to N,N'-bis-isocyanato-tolyluretdione polysulphonic acids while diisocyanatodiphenyl methane gives rise to the corresponding bis-isocyanato-uretdione polysulphonic acids.

Aromatic isocyanatopolysulphonic acids which have two or more sulphonic acid groups per monomer unit are novel substances with very valuable properties. They constitute an important advance of the chemistry and technology of isocyanates. They are highly hydrophilic isocyanates which are easily prepared and are suitable for the preparation of various isocyanate derivatives, in particular of polyaddition products containing sulphonic acid or sulphonate groups. They have substantially no vapor pressure, are substantially non-toxic and dissolve readily in water with the evolution of carbon dioxide.

It is surprisingly found that the isocyanate group remains intact even in the presence of a molar excess of sulphur trioxide and formation of black tarry decomposition products of the isocyanate does not occur. It is only at a very high degree of sulphonation that the isocyanate group disappears from the IR spectrum. This is probably due to intramolecular adduct formation with a sulphonic acid group in the ortho-position. However, since this adduct formation is reversible, the product preserves the character of an isocyanate.

The present invention thus relates to isocyanatopolysulphonic acids, which may be in the form of their salts with an organic or inorganic base, having a structure which comprises from 1 to 3 aromatically bound isocyanate groups which may be at least partly present in the dimerized form as uretdione groups, and containing from 2 to 6 sulphonic acid or sulphonate groups for each non-dimerized isocyanatopolysulphonic acid or for each monomeric isocyanatopolysulphonic acid on which the dimer is based.

Isocyanates according to the invention which are of particular interest are those aromatic isocyanates which have from 7 to 32 carbon atoms, 1 to 3 aromatic rings, 1 to 3 isocyanate groups and 2 to 6 sulphonic acid groups per monomer unit.

Since sulphonation is in most cases accompanied by an isocyanate dimerization with uretdione formation, the figures given above with respect to the carbon content, number of isocyanate groups, number of sulphonic acid groups, etc. invariably refer to the "monomer unit", i.e. to the non-dimerized molecule. The term "isocyanate groups" is intended to include those isocyanate groups which are dimerized during sulphonation or which react with a sulphonic acid group under adduct formation.

Preferred isocyanatopolysulphonic acids according to the invention are compounds of the formula:

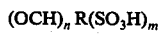
(OCH)$_n$ R(SO$_3$H)$_m$ which may be present in the dimerized form, wherein R represents a mononuclear, dinuclear or trinuclear aromatic hydrocarbon group having a valency of $(n + m)$ which may be interrupted by alkylene groups of from 1 to 3 carbon atoms and which may be substituted by alkyl groups with 1 to 4 carbon atoms; $n$ represents an integer of from 1 to 3; and $m$ represents an integer of from 2 to 6 and generally has a value of 2 to 3 in the case of mononuclear compounds, 2 to 4 in the case of dinuclear compounds and 2 to 6 in the case of trinuclear compounds.

Isocyanates according to the invention which are particularly preferred are compounds of the formula

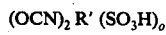
(OCN)$_2$ R' (SO$_3$H)$_o$ in dimerized form, wherein o represents an integer of from 2 to 4 and R' represents a mononuclear or dinuclear aromatic hydrocarbon group with a valency of 4 to 6 which has a total of 6 to 13 carbon atoms and which, if mononuclear, may be methyl substituted and if dinuclear may be interrupted by methylene bridges.

The starting isocyanate used for the process of the present invention may be essentially any aromatic mono- or polyisocyanates as well as their monosulphonic acids provided one of the benzene rings contained therein still has a hydrogen atom capable of being substituted. The following are examples: Phenyl isocyanate; p-tolylisocyanate; p-chlorophenylisocyanate; p-nitro-phenylisocyanate; p-methoxyphenylisocyanate; m-chlorophenylisocyanate; m-chloromethylphenylisocyanate; p-chloromethylphenylisocyanate; 4,4'-stilbene diisocyanate; 4,4'-dibenzyldiisocyanate; 3,3'- and 2,2'-dimethyl-4,4'-diisocyanatodiphenylmethane; 2,5,2',5'-tetramethyl-4,4'-diisocyanatodiphenylmethane; 3,3'-dimethoxy-4,4'-diisocyanatodiphenylmethane; 3,3'-dichloro-4,4'-diisocyanatodiphenylmethane; 4,4'-diisocyanato-dimethylmethane; 4,4'-diisocyanato diphenylcyclohexylmethane; 4,4'-diisoyanatobenzophenone; 4,4'-diisocyanato-diphenylsulphone; 4,4'-diisocyanato-diphenylether; 4,4'-diisocyanto-3,3'-dibromodiphenylmethane; 4,4'-diisocyanato-3,3'-diethyl-diphenyl methane; 4,4'-diisocyanato-diphenyl-ethylene-(1,2); 4,4'-diisocyanato-diphenylsulphide; 1,3-and 1,4-phenylene diisocyanate; 2,4- and 2,6-tolylene diisocyanate and any mixtures of these isomers; diphenylmethane-2,4'- and/or 4,4'-diisocyanate; naphthylene-1,5-diisocyanate; triphenyl methane-4,4',4''-triisocyanate; polyphenyl-polymethylene polyisocyanates which have been described, for example, in British Pat. Nos. 874,430 and 848,671 and can be obtained by aniline-formaldehyde condensation followed by phosgenation; polyisocyanates containing carbodiimide groups as described in German Pat. No. 1,092,007; diisocyanates of the kind described in U.S. Pat. No. 3,492,330; polyisocyanates having allophanate groups as described e.g. in British Pat. No. 994,890; Belgian Pat. No. 761,626 and published Dutch Patent Application No. 7,102,524; polyisocyanates having isocyanurate groups as described e.g. in German Pat. Nos. 1,022,789; 1,222,067 and 1,027,394 and German Offenlegungsschriften Nos. 1,929,034 and 2,004,048; polyisocyanates having acylated urea groups according to German Pat. No. 1,230,778 and polyisocyanates having biuret groups as described e.g. in German Pat. No. 1,101,394; British Pat. No. 889,050 and French Pat. No. 7,017,514. The distillation residues containing isocyanate groups from the commercial production of isocyanates may also be used, either alone or as solutions in one or more of the above mentioned polyisocyanates. Any mixtures of the above mentioned polyisocyanates may also be used.

Also suitable for the process according to the invention are phosgenation products of condensates of aniline and aldehydes or ketones such as acetaldehyde, propionaldehyde, butyraldehyde, acetone or methyl ethyl ketone, etc.. The phosgenation products of condensates of anilines which are alkyl substituted on the nucleus, in particular toluidines, with aldehydes or ketones such as formaldehyde, acetaldehyde, butyraldehyde, acetone, methyl ethyl ketone, etc. are also suitable.

Suitable starting materials for the process according to the invention also include reaction products of the aforesaid aromatic polyisocyanate mixtures with from about 0.2 to about 25 mol % of polyols, provided that the viscosity of the resulting reaction products does not exceed 10,000 cP at 25° C. and the isocyanate content of the reaction products is at least 10% by weight. Particularly suitable polyols for modifying the starting materials are the polyether polyols and/or polyester polyols known in polyurethane chemistry which have molecular weights within the range of from about 200 to about 6000, preferably 300 to 4000, as well as low molecular weight polyols with molecular weights within the range of 62 and 200. Examples of such low molecular weight polyols include ethylene glycol, propylene glycol, glycerol, trimethylol propane and 1,4,6-hexanetriol, etc..

The following are particularly preferred polyisocyanates: 2,4-diisocyanatotoluene and/or 2,6-diisocyanatotoluene; 1,3-diisocyanatobenzene; 1,4-diisocyanatobenzene; 2,4'-diisocyanatodiphenylmethane; 4,4'-diisocyanatodiphenylmethane and the phosgenation products of aniline-formaldehyde condensates.

Sulphonation is carried out under anhydrous conditions using sulphur trioxide or organic compounds in which sulphur trioxide is bound by addition. The sulphur trioxide may be used in liquid, dissolved or gaseous form, e.g. it may be diluted with nitrogen. The organic compounds used in which sulphur trioxide is bound by addition include pyridine-$SO_3$, dioxane-$SO_3$, tetrahydrofuran-$SO_3$, ether-$SO_3$ and dimethylformamide-$SO_3$. Sulphonation is preferably carried out using gaseous sulphur trioxide.

The solvents used must be chemically inert under the reaction conditions both towards sulphur trioxide and towards the isocyanate group. The solvents which are preferably used are halogenated or nitrated hydrocarbons such as dichloroethane, tetrachloroethane, methylene chloride, chloroform, fluorotrichloromethane, nitromethane or nitrobenzene or ether, dioxane, tetrahydrofuran or sulphur dioxide.

The quantity of sulphur trioxide required for polysulphonation is from 2 to 6 mol per mol of aromatic isocyanate. This corresponds to more than 50% by weight, preferably from 60 to 300% by weight, based on the unsulphonated isocyanate used as starting material.

The quantity of sulphur trioxide required for sulphonating mononuclear isocyanates such as tolylene diisocyanate is from 90 to 200% by weight of sulphur trioxide based on the isocyanate. The quantity used for dinuclear isocyanates, such as diisocyanatodiphenylmethane, is from 60 to 200% by weight.

Quantities of greater than 200% by weight of sulphur trioxide are used only in exceptional cases i.e. when sulphonation is difficult to achieve and therefore an excess of sulphur trioxide is required.

Since the reaction products are in all cases solid, high melting substances and in most cases crystalline, the reaction is generally carried out in a solvent in which the reaction products generally precipitate in a crystalline form so that they can easily be separated. However, it is also possible to combine the isocyanate in the form of a gas or mist with gaseous sulphur trioxide, in which case the polysulphonic acids are directly obtained as dry powders. Finally, the sulphonating reaction may be carried out in liquid sulphur trioxide. For example, solid isocyanate-monosulphonic acids in powder form may be introduced into liquid sulphur trioxide.

If sulphonation to the polysulphonic acid is carried out using a monosulphonic acid as starting material, the quantity of sulphur trioxide used may, of course, be reduced accordingly. The reaction is then carried out with from 1 to 5 mol, preferably 1 to 3 mol of sulphur trioxide based on 1 mol of isocyanatomonosulphonic acid. However, there is no disadvantage in using a larger excess of sulphur trioxide if persulphonation is to be carried out.

The process according to the invention is carried out at temperatures of from −10° C. to 140° C., preferably from 0° C. to 100° C. It is preferably carried out by introducing the isocyanate in anhydrous solvent into the reaction vessel and passing sulphur trioxide, optionally diluted with nitrogen, over the surface of the stirred mixture or adding a solution of sulphur trioxide in an inert solvent, e.g. at a concentration of 20 to 40%.

On the other hand, the process may also be carried out by introducing a solution of sulphur trioxide or one of the sulphur trioxide adducts mentioned above in an organic solvent into the reaction vessel and adding the isocyanate in liquid or gaseous form. This method is particularly suitable for continuous sulphonation in which an excess of sulphur trioxide is constantly maintained in the reaction vessel and the suspension obtained from sulphonation is continuously processed by filtration or centrifuging and the filtrate containing sulphur trioxide is returned to the reaction vessel, if required, after addition of fresh sulphur trioxide.

The isocyanatopolysulphonic acids according to the invention precipitate as white to pink or brown insoluble, solids. They are preferably pulverulent crystalline products which can easily be filtered, centrifuged or separated by some other simple method. The solvent can be used again for sulphonation.

One particularly mild method of preparing aromatic isocyanatopolysulphonic acids comprises at first sulphonating to the monosulphonic acid or corresponding uretdione at as low a temperature as possible and then adding further sulphur trioxide. If necessary, the reaction temperature can finally be raised. The products obtained by this process have exceptionally little discoloration.

The solid isocyanatopolysulphonic acids obtained are non-toxic products and degradation of polymers produced from then again gives rise to non-toxic substances (amino polysulphonic acids).

The isocyanatopolysulphonic acids according to the invention can therefore be used for various purposes as physiologically harmless diisocyanates. For example, they may be used as starting materials for syntheses carried out by the diisocyanate polyaddition process, as cross-linking agents, and for the production of polyisocyanurates, polycarbodiimides, polyimides or polyhydantoins. Because of their highly polar or ionic character, the uretdione diisocyanates according to the present invention are particularly suitable for the synthesis of water-soluble or water-dispersible polyurethanes and polyurethane ureas.

The diisocyanato and polyisocyanato polysulphonic acids can be used as such or in the form of the above mentioned reaction products, for the preparation of binders and impregnating agents, particularly for inorganic or mineral substrates, and also for the preparation of physically cross-linked ionomers and cation exchangers and membranes.

They can be hydrolyzed with water to the corresponding amino polysulphonic acids which can be widely used as intermediate products, for example in the manufacture of dyes.

The isocyanate polysulphonic acids are also versatile in their use as substances which can render other compounds hydrophilic or ionic since they can enter into reactions with other high or low molecular weight substances, by means of their isocyanate group, to introduce the aromatic polysulphonic acid group. The isocyanato sulphonic acids can be converted into their corresponding salts by reaction with bases, in particular with tertiary amines.

Suitable tertiary amines include, for example, trimethylamine, triethylamine, tributylamine, dimethylaniline and pyridine. Conversion of the acids into their corresponding salts may be carried out, for example, by suspending the acids in a non-solvent such as the halogenated alkanes used for their preparation or by dissolving them in solvents such as acetone and then adding the tertiary amine used for their conversion into the salt. The salts may also be prepared by other methods, such as by gasification of the pulverulent acids with gaseous tertiary amines. Salts of these acids with inorganic bases, which are less preferred in the context of this invention, may be prepared, for example, by reacting solutions of the acids, for example in acetone, with dispersions of alkali metals, in particular dispersions of sodium or potassium, e.g. in toluene.

The free isocyanato polysulphonic acids according to the invention are characterized by containing between 35 and 65% (preferably 38 to 60%) of $SO_3H$ groups. This corresponds to a sulphur content of 13.8 to 26% (preferably 15 to 24%) and having a total isocyanate content of from 10 to 25%, at least part of which is generally in the form of uretdione.

EXAMPLES

Methods of Sulphonation

Method 1:

A 10 to 40% solution of the isocyanate in 1,2-dichloroethane is introduced into the reaction vessel and gaseous sulphur trioxide is passed over the surface of the solution with stirring at room temperature.

The isocyanatopolysulphonic acid precipitates as a crystalline powder and a suspension is formed. The precipitate is left to settle and the solvent is decanted together with any sulphur trioxide which it contains. A small amount 1,2-dichloroethane is added and the product is rapidly suction filtered in a glass filter and dried in a vacuum drying cupboard at 50° C.

Method 2:

A 30% solution of sulphur trioxide in 1,2-dichloroethane is introduced into the reaction vessel and a solution of the isocyanate in 1,2-dichloroethane is added dropwise at room temperature. The product is processed as in Method 1.

Method 3:

A 10–40% solution of the isocyanate in 1,2-dichloroethane is introduced into a reaction vessel and a 30% solution of sulphur trioxide in 1,2-dichloroethane is added dropwise. The product is processed as in Method 1.

Method 4:

Similar to method 2 but using tetrachloroethane instead of dichloroethane.

Method 5:

A 10–40% solution of the isocyanate in dichloroethane is introduced into the reaction vessel and a 30% solution of sulphur trioxide in tetrachloroethane is added dropwise. The product is processed as in Method 1.

Isocyanates used:
I: Tolylene-2,4-diisocyanate

| A | B | C | D | E | F | G | H | I | K | L | M | N | O |
|---|---|---|---|---|---|---|---|---|---|---|---|---|---|
| 1 | I | 58 | 87 | | 1.05 | 50 mins. | 30° C | 2 | 73 | 14.85 | 8.6 | white, coarse grained | 37.6 |
| 2 | II | 174 | 821 | | 3.05 | 18 ½ hrs. | 30° C | 1 | 360 | 23.65 | 3.1 | white, coarse grained | 60 |
| 3 | I | 174 | 550 | | 2.08 | 12 ½ hrs. | 30° C | 3 | 317 | 18.6 | 20.6 | white, coarse grained | 47 |
| 4 | II | 26.1 | 148 | | 0.5 | 2 hrs. | 30° C | 5 | 41 | 19.55 | 19.8 | grey, coarse grained | 49.5 |
| 5 | III | 26.1 | 235 | | 0.5 | 1 hr. | 30° C | 5 | 50 | 21.4 | 18.5 | grey, coarse grained | 54 |
| 6 | IV | 37.5 | 87.5 | | 0.5 | 1 hr. | 30° C | 5 | 74 | 16.3 | 10.9 | fine grained, pale pink | 41.2 |
| 7 | IV | 37.5 | | 150 | 0.75 | 5 hrs. 20 min. | 120° C | 4 | 96 | 19.75 | 1.9 | reddish brown, coarse | 50 |
| 8 | I | 26.1 | 235 | | 0.5 | 35 mins. | 30/60° C | 5 | 44 | 19.8 | 12.8 | brown, coarse | 50 |
| 9 | V | 70.9 | 435 | | 0.5 | 3 ¼ hrs. | 30° C | 5 | 112 | 11.5 | 7.5 | yellowish, fine grained | 29 |
| 10 | VI | 55.2 | 165 | | 0.5 | 1 hr. | 30° C | 5 | 78 | 14.82 | 6.1 | yellowish, coarse | 37.4 |
| 11 | VII | 42 | 126 | | 0.5 | 1 hr. | 30° C | 5 | 79 | 15.85 | 11.8 | fine grained | 40 |
| 12 | VIII | 19.95 | 113 | | 0.5 | 1 hr. 15min. | 30° C | 5 | 50 | 20.65 | 1.5 | yellowish, coarse | 52.5 |
| 13 | IX | 23.02 | 53.6 | | 0.5 | 2 hrs. | 30° C | 5 | 4 | 16.8 | | yellowish, coarse | 42.5 |
| 14 | X | 17.85 | 120 | | 0.5 | 1 hr. | 30° C | 5 | 35 | 24.35 | | light brown coarse | 61.5 |
| 15 | XI | 37.5 | 87.5 | | 0.5 | 40 mins. | 30° C | 5 | 74 | 15.85 | 10.9 | brown, coarse | 40 |
| 16 | XII | 37.5 | 87.5 | | 0.5 | 40 mins. | 30° C | 5 | 71 | 15.6 | 15.0 | brown, coarse | 39.4 |
| 17 | XIII | 37.5 | 87.5 | | 0.5 | 50 mins. | 30° C | 5 | 73 | 15.3 | 12.6 | brown, coarse | 38.7 |
| 18 | XIV | 37.5 | 337.5 | | 0.75 | 30 mins. | 30° C | 5 | 78 | 14.85 | 6.3 | grey, coarse | 37.8 |
| 19 | IV | 37.5 | 150 | | 1.0 | 40 mins. | 30° C | 2 | 56 | 16.0 | 14.8 | yellowish, coarse | 40.5 |
| 20 | IV | 37.5 | 87.5 | | 1.5 | 1 hr. | 30° C | 2 | 58 | 18.35 | 13.8 | yellowish, coarse | 46.5 |
| 21 | XV | 37.5 | 87.5 | | 0.5 | 1 hr. | 30° C | 5 | 70 | 14.35 | 10.4 | brown, coarse | 36.3 |
| 22 | XVI | 31.5 | 280 | | 0.5 | 35 mins. | 30° C | 5 | 46 | 13.9 | — | yellowish, fine | 35.2 |

II: Mixture of 80% of tolylene-2,4-diisocyanate and 20% of tolylene-2,6-diisocyanate
III: Mixture of 65% of tolylene-2,4-diisocyanate and 35% of tolylene-2,6-diisocyanate
IV: 4,4'-Diisocyanatodiphenylmethane
V: Adduct of 3 mol of tolylene-2,4-diisocyanate and 1 mol of 1,1,1-trimethylolpropane
VI: Adduct of 1 mol of tripropylene glycol and 5 mol of 4,4'-diisocyanatodiphenylmethane
VII: Partly carbodiimidized 4,4'-diisocyanatodiphenyl methane (30% isocyanate)
VIII: m-Toluene isocyanate
IX: p-Chlorophenyl isocyanate
X: Phenyl isocyanate
XI: The crude phosgenation product of an aniline-formaldehyde condensate is distilled to remove diisocyanatodiphenylmethane until the distillation residue has a viscosity of 100 cP at 25° C. (dinuclear portion 59.7% by weight, trinuclear portion 21.3% by weight, proportion of higher nuclear polyisocyanates 19.0% by weight).
XII: Polyisocyanate similar to XI having a viscosity of 200 cP at 25° C. (dinuclear portion 44.3% by weight trinuclear portion 23.5% by weight, proportion of higher nuclear polyisocyanates 32.2% by weight).
XIII: Polyisocyanate similar to XI and XII having a viscosity of 400 cP at 25° C.
XIV: Polyisocyanate containing isocyanate groups (16.8% by weight isocyanate) obtained by trimerization of 2,4-diisocyanatotoluene
XV: Polyisocyanate prepared as described under XI having a viscosity of 1500 cP (dinuclear portion 40.8% by weight, trinuclear portion 34.0% by weight, proportion of higher nuclear polyisocyanates 25.8% by weight)
XVI: 1,5-Diisocyanatonaphthalene The experimental data are summarized in the following Table:

The symbols in the above table have the following meaning:
A: Example number
B: Isocyanate,
C: Quantity of isocyanate in g,
D: Quantity of dichloroethane put into the process in g
E: Quantity of tetrachloroethane put into the process in g
F: Quantity of sulphur trioxide put into the process in mol
G: Time required for addition in gaseous or liquid form
H: Reaction temperature
I: Method of preparation
K: Yield in g
L: Sulphur in % by weight
M: Isocyanate content in % by weight (total content including the uretdione groups present)
N: Appearance of resulting powder
O: $SO_3H$ groups in % by weight calculated from the sulphur content

What is claimed is:
1. Solid Isocyanatopolysulphonic acids comprising from 1 to 3 aromatically bound isocyanate groups which may be present at least partly in the dimerized form as uretdione groups and from 2 to 6 sulphonic acid groups for each non-dimerized isocyanatopolysulphonic acid or for each monomeric isocyanatopolysulphonic acid on which the dimer is based.

2. The isocyanatopolysulphonic acids of claim 1 which are in the form of the salt with an inorganic or organic base.

3. The acids of claim 1 which have a sulphur content of from 15 to 24%.

4. Solid Isocyanatopolysulphonic acids of the formula $$(OCN)_n R(SO_3H)_m$$

which may be present in the dimerized form containing uretdione groups, in which formula R represents a mononuclear, dinuclear or trinuclear aromatic hydrocarbon group having a total of 6 to 20 carbon atoms, which may be interrupted by alkylene groups having 1 to 3 carbon atoms or substituted by alkyl groups having 1 to 4 carbon atoms; $n$ represents an integer of from 1 to 3; and $m$ an integer of from 2 to 6.

5. The isocyanatopolysulphonic acids of the formula of claim 4 in which formula $n = 2$, $m$ represents an integer of from 2 to 4 and R denotes a 4–6-valent mononuclear of dinuclear aromatic hydrocarbon group having a total of 6 to 13 carbon atoms and which may be methyl substituted if mononuclear and which may be interrupted by a methylene bridge if dinuclear.

6. The isocyanatopolysulphonic acids of claim 4 which are in the form of the salt with an inorganic or organic base.

7. A process for the preparation of solid aromatic isocyanatopolysulphonic acids comprising reacting monoisocyanates or polyisocyanates having exclusively aromatically bound isocyanate groups with sulphur trioxide at −10° C. to 140° C., wherein the isocyanate used as starting material which is to be sulphonated is reacted with at least 50% by weight of sulphur trioxide, based on the quantity of isocyanate used as starting material.

8. The process of claim 6 wherein gaseous sulphur trioxide is passed over the surface of a reaction containing the isocyanate in anhydrous solvent.

9. A process for the preparation of isocyanatopolysulphonic acids having exclusively aromatically bound isocyanate groups comprising reacting isocyanatomonosulphonic acids which have exclusively aromatically bound isocyanate groups with sulphur trioxide.

* * * * *